Jan. 13, 1953  F. A. FIRESTONE  2,625,035
SUPERSONIC INSPECTION DEVICE
Filed Dec. 22, 1945  2 SHEETS—SHEET 1
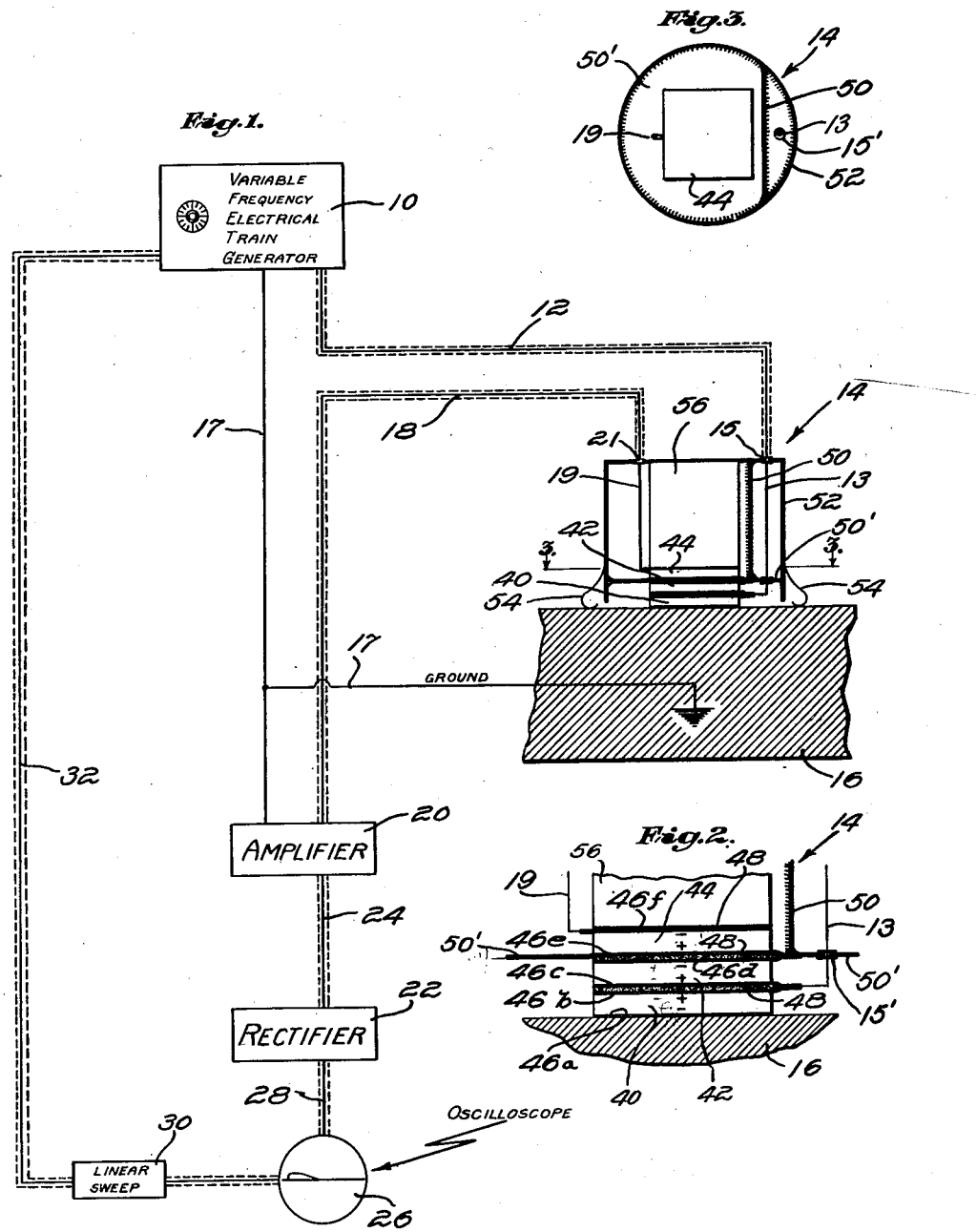

Jan. 13, 1953  F. A. FIRESTONE  2,625,035
SUPERSONIC INSPECTION DEVICE
Filed Dec. 22, 1945  2 SHEETS—SHEET 2
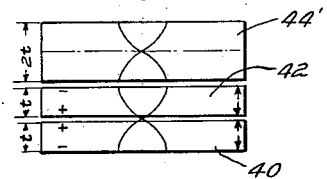
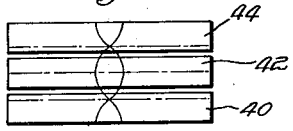
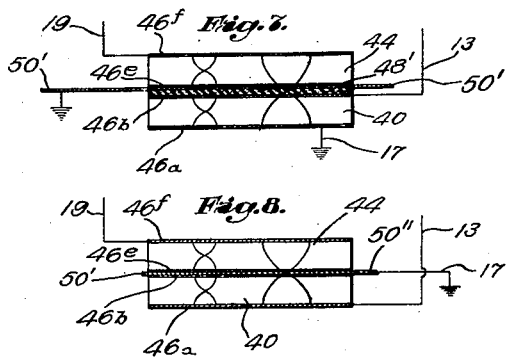
Inventor
Floyd A. Firestone
by H. Hume Mathews
Attorney Patented Jan. 13, 1953

2,625,035

UNITED STATES PATENT OFFICE 2,625,035

SUPERSONIC INSPECTION DEVICE

Floyd A. Firestone, Washington, D. C., assignor to United Aircraft Corporation, East Hartford, Conn., a corporation of Delaware Application December 22, 1945, Serial No. 637,067

18 Claims. (Cl. 73—67)

This invention relates to electromechanical transducers, and particularly to a piezoelectric crystal apparatus for sending and receiving supersonic wave trains.

An object of this invention is to provide an improved means for sending vibration waves into a material medium and for receiving vibration waves from said medium, and particularly for sending and receiving supersonic vibration waves into and from a solid material, such as a metal part.

A further object is to provide a device which may be connected in a novel manner, according to the invention, to electrically separated sending and receiving circuits, and which will radiate energy from the sending circuit and feed energy to the receiving circuit, without materially affecting the electrical isolation of the two circuits.

A further object is to provide sending and receiving transducers so placed that the receiving transducer is most sensitive to reflections received from that region into which the sending transducer radiates most strongly.

Another object is to provide a sandwich, or stack, of mechanically connected and electrically separated quartz crystals including at least one crystal for changing electrical vibrations into mechanical vibrations and at least one crystal for changing mechanical vibrations into electrical vibrations.

A further object is to provide a unitary sending and receiving transducer particularly adapted for use with the apparatus or methods of my prior patent No. 2,280,226 and my copending applications Serial No. 448,983, filed June 29, 1942, now Patent No. 2,398,701, Serial No. 471,173, filed January 2, 1943, now abandoned, Serial No. 511,089, filed November 20, 1943, now Patent No. 2,439,130, and Serial No. 511,090, filed November 20, 1943, now Patent No. 2,439,131.

Other objects and advantages will be apparent from the specification and claims, and from the accompanying drawing which illustrates what is now considered to be a preferred embodiment of the invention.

In the drawing:

Fig. 1 is a diagrammatic view of a supersonic wave train material inspection device which incorporates a transducer constructed and connected in accordance with the teaching of this invention.

Fig. 2 is an enlarged front view, partly in section, of the transducer of Fig. 1 mounted on a material to be inspected.

Fig. 3 is a sectional view, looking down, taken on the line 3—3 of Fig. 1.

Figs. 4, 5, 6, 7 and 8 are diagrammatic views showing five different modifications of crystal arrangements, each of which may be used with the circuit and transducer apparatus of Figs. 1, 2 and 3.

In electrical apparatus and particularly in apparatus utilizing pulses of electrical energy, it is sometimes necessary to radiate energy through a sending device at a relatively high energy level and receive energy through a receiving device at a relatively low energy level. It is often desirable to use a single device for both sending and receiving; yet the receiving circuit must be electrically isolated from the sending circuit for maximum sensitivity. One instance of this problem is illustrated in my Patent No. 2,280,226. With the apparatus of this patent simplicity of operation may be obtained through the use of a single crystal or transducer for both sending and receiving the supersonic vibration wave trains. But the sending and receiving circuits should be electrically separated or isolated for best results, because the receiving circuit must be sensitive to the very small changes in potential generated across the receiving crystal by the reflected or received mechanical vibration wave trains and its sensitivity would be impaired by the high voltage pulses of the sending circuit if the two circuits were electrically linked. The acoustical regions of action of the sending and receiving transducers should preferably overlap; yet the sending and receiving circuits should preferably be electrically isolated.

According to this invention, this problem is solved by a novel and improved sending and receiving device, connected to the sending and receiving circuits in a novel and improved manner. In the embodiment of the invention selected for illustration herein, a plurality of quartz crystals are stacked like a sandwich, the individual crystals, at least one of which is a sender and at least one other of which is a receiver, being mechanically interconnected and functioning mechanically as a unit. From an electrical standpoint, the sender or senders and receiver or receivers are electrically separated, or isolated, so that neither materially affects the other.

Referring to the drawing, Fig. 1 shows an embodiment of the invention as applied to a supersonic wave train material inspection apparatus which may be of the type disclosed and claimed in the patent or the applications referred to above. As specifically described in this patent and these applications, the train generator 10, shown in Fig. 1, sends voltage trains of relatively high voltage (for instance about 500 volts is suitable for some installations) through the shielded cable 12 to a transducer, generally indicated at 14. The transducer changes the electrical oscillations or vibrations into mechanical vibrations and, when it is in effective contact, for instance through an oil or water film (not shown), with the material or work piece 16, will send mechanical vibration wave trains into the material which correspond in frequency and in number of cycles per train to the exciting voltage wave trains. These vibration trains are reflected (for instance by a crack or flaw in the material being inspected) back to the transducer and cause it to vibrate and create voltage trains corresponding in frequency to the exciting voltage trains but of very much smaller amplitude (for instance of the order of magnitude of .001 to 1 volt), which are transmitted through the shielded cable 18 to the amplifier 20. The exciting trains or pulses are preferably so spaced that the reflected vibrations are received or picked up by the transducer in the intervals between the termination of each exciting voltage train and the beginning of the next succeeding train. After amplification by circuit 20, the voltage trains representing the reflected vibration wave trains are passed to a rectifier 22 through cable 24 and the rectified waves are impressed across one pair of the plates of oscilloscope 26, by cable 28. The other pair of oscilloscope plates are connected with the linear sweep circuit 30, which is connected with the exciting circuit or train generator 10 by cable 32. With this arrangement the received voltage trains representing reflected vibration wave trains may be projected on the oscilloscope screen, on a time basis if desired, so that the nature of the reflected vibration trains or the time at which they are received relative to the time the exciting voltage trains are sent may be determined. For a more complete disclosure of this apparatus, reference is made by my Patent No. 2,280,226 and my application Serial No. 448,983, now Patent No. 2,398,701.

Transducer 14 includes two sending crystals 40, 42 and a single receiving crystal 44. Each of these crystals, in the embodiment of Fig. 1, is an X-cut quartz crystal for sending longitudinal vibration wave trains down into the material 16. Each crystal 40, 42, 44 is electroplated on the faces to be energized, the YZ faces in this instance, with electrically conductive coatings 46a, 46b, 46c, 46d, 46e, 46f (Fig. 2). These coatings (which may be of copper) act as electrodes across which the exciting voltage oscillations may be impressed to energize the respective crystals.

The three crystals are arranged in a stack or pile with their X axes in alignment, and are firmly secured together in the form of a sandwich with cement 48 placed between the opposed faces of each pair of adjacent electrode coatings. Cement 48 need not be electrically conducting but it must be capable of transmitting mechanical vibration waves from one crystal to another, preferably with little or no damping. A suitable cement for this purpose is hard deKhotinski of Central Scientific Company; or any hard, rigid wax, cement, glue or solder, preferably in the thinnest layer practicable. Rosin, Wood's metal or plaster of Paris may be used. The order of magnitude of the thickness of the cement may be about .001 inch, but is not critical.

In the embodiments of the drawing, the two lower crystals 40, 42 are used for sending and the upper crystal 44 is used for receiving. Lower electrode 46a of the bottom crystal 40 is grounded, as by placing it in electrical contact with the work 16, which is connected to the ground lead 17. Where an insulating oil film is used between the electrode 46a and the work 16, so as to transmit mechanical vibrations therebetween, the electrode 46a is nevertheless effectively grounded to the work by electrostatic capacity. Upper electrode 46d of crystal 42 is also grounded, through an electrical shield consisting of disk 50' and a wall or partition 50 electrically connected to a metal cup or housing 52. The housing electrically shields the entire assembly and is grounded to the work 16 by metal spring clips 54. Intermediate electrodes 46b, 46c of crystals 40, 42 are both connected to the high voltage lead 13 of the shielded cable 12. Insulators 15, 15' electrically separate lead 13 from shields 52, 50'. With this circuit and electrode arrangement sending crystals 40, 42 are subjected to electrical fields of opposite directions; however, by reversing the polarity of crystals 40, 42 they may both be made to expand at one time even though the electric fields through them are opposite. Or, if they are left of the same polarity, operation is still possible if the frequency is adjusted to correspond to the thickness of one of the crystals 40, 42 only, as explained below in connection with Figs. 4 to 7.

In Fig. 1, crystal 44 is used for receiving. The reflected vibration waves or wave trains pass from the metal part through crystals 40, 42 and cement layers 48 and actuate the receiving crystal. Top electrode 46f of the receiving crystal is electrically "high" and is connected to lead 19 of the shielded cable 18, leading to amplifier 20. Insulator 21 electrically separates lead 19 from housing 52. Bottom electrode 46E of crystal 44 is connected to the shield partition 50', and thereby to ground. Amplifier 20 is also connected to ground by lead 17.

All three crystals are cemented together and are also preferably secured by cement 48 to a support 56 composed of a mechanical vibration wave damping material, such as Bakelite, which has the property of absorbing vibration waves of the frequency or frequencies of the waves sent and received by the crystals. Housing shield 52 is cemented or otherwise secured to support 56, so that the entire assembly may be handled as a unit and readily moved from place to place on the surface of the work 16. Damping material 56 is preferably of such character to also serve as an electrical insulator between electrode 46f and the housing 52; otherwise a separate insulating material may be provided for this purpose.

Housing 52 is preferably made of metal, such as copper or aluminum. Partitions 50, 50' are made of like material and are electrically connected, as by soldering, welding or brazing, along their edges to each other and to the housing. The disk partition 50' may be continuous and extend through cement 48 between electrodes 46d, 46e, or it may be provided with a square opening, as in Figs. 1, 2 and 3, to receive the crystal stack. In either case the electrodes 46d, 46e are electrically connected to shield 50' and the shields 50, 50' are arranged so as to electrically separate the sending lead 13 and the parts connected thereto from the receiving lead 19 and the parts connected thereto.

Fig. 4 shows a modification of the crystal stack in which the adjacent faces or electrodes of the sending crystals 40, 42 are simultaneously energized in the same sign (as shown at the left of the figure); the other two faces are therefore simultaneously energized in the opposite sign. The polarity of crystals 40, 42 is such that they expand together and contract together, as shown by the arrows at the right of the figure, when an exciting voltage train is applied. With this arrangement, receiving crystal 44' is preferably of a thickness equal to $2t$, where $t$ is the thickness of each crystal 40, 42, and the preferred working frequency (frequency of each exciting voltage pulse) is $$f = \frac{v}{4t}$$

where $v$ is the velocity of propagation of the longitudinal wave through the thickness of the crystal, or piezoelectric plate. Sending crystals 40, 42 vibrate as a unit, in the same manner as does the double thickness receiving crystal 44', and the preferred mode of crystal vibration is shown schematically by the wave forms or curves in Fig. 4.

In Fig. 5, the polarity of crystals 40, 42 is the same, rather than being reversed as in Fig. 4, and the receiving crystal 44 is of the same thickness ($t$) as each sending crystal. Thus, with the same energization as in Fig. 4, one of the crystals 40, 42 of Fig. 5 will expand when the other contracts. The preferred working frequency with the arrangement of Fig. 5 is $$f = \frac{v}{2t}$$

and the preferred mode of crystal vibration is represented by the wave forms schematically shown on the drawing.

The normal or preferred modes of crystal vibration are shown approximately by the wave forms in Figs. 4 and 5 but other modes may be used by selecting other working frequencies for the exciting voltage oscillations, or satisfactory operation may be accomplished with the crystal system not resonant at the working frequency. One such alternative mode of vibration is illustrated by the wave form shown in Fig. 6, in which the outer faces of the crystal stack expand or contract together and two nodes are present equally spaced through the thickness of the stack. Apart from the working frequency selected and the mode of vibration, the arrangement of Fig. 6 is the same as that of Fig. 5.

A simplified arrangement, using only two crystals, is illustrated in Fig. 7. Sending crystal 40 is energized between electrode coatings 46a, 46b by lead 13 and ground 17. Receiving crystal 44 generates a potential between electrode coating 46e (connected to ground by shield 50') and electrode coating 46f. Cement 48' is made of electrical insulating material and not only secures the two crystals together mechanically but separates them electrically (it also insulates shield 50' from electrode coating 46b). The two crystals preferably have the same thickness and the sending crystal may be energized at a working frequency which causes the assembly to vibrate in a preferred mode having a node at the center of the sending crystal as shown approximately by the wave form at the left in Fig. 7; or the working frequency may be selected to provide other modes of vibration, for instance that shown approximately by the wave form at the right in Fig. 7, in which the node is located midway between the two outer faces of the crystal stack.

Fig. 8 shows a modification similar to Fig. 7 but with the work and the electrode adjacent thereto being electrically high. Electrode 46f is also high and the two intermediate electrodes 46b, 46e are grounded to the shield 50", which extends between the two crystals. With this arrangement, it is not necessary to provide the insulating material 48', as was the case in Fig. 7.

While the embodiments of the invention described above relate particularly to longitudinal waves, or wave trains, it is to be understood that the invention is also applicable to installations using shear waves (which may be generated by a Y cut quartz crystal cemented to the work surface) or surface waves (which may be generated by a Y cut quartz crystal connected to the work surface by a liquid film of low viscosity). Reference is made to application Serial No. 511,089, now Patent No. 2,439,130, for a detailed description of surface and shear wave generating apparatus and methods which may be used with the present invention.

Further, it is to be understood that the present invention may be used with continuous exciting waves, rather than wave trains or pulses. For instance, the sending wave may be continuous but with a variable frequency, so that when the material being tested becomes resonant the receiving crystal will pick up an additional component; this component may be detected to determine the resonant condition. By measuring the frequency at which resonance occurs (using either wave trains or continuous waves) the characteristics of the material being inspected may be determined, as fully explained in application Serial No. 511,090, now Patent No. 2,439,131.

*Operation*

Train generator 10 sends out high voltage wave trains or pulses (which preferably are of a frequency to cause the crystal or crystals to resonate in a preferred mode of vibration, within the range from about 0.1 megacycle to about 30 megacycles) through the lead 13 of the shielded cable 12, in the manner described in my patent and my applications referred to above. The other lead 17 of the train generator is grounded to the work and consequently sending crystals 40, 42 will be subjected to high tension oscillating electric fields, of opposite directions. The sending crystals are therefore subjected to a rapidly varying stress and will vibrate during each pulse at the frequency of each voltage train (which is preferably also the resonant frequency of the crystal) in the direction of their X axes, normal to the surface of the work. This causes mechanical vibration wave trains, corresponding in duration and frequency to the duration and frequency of the exciting voltage trains to be sent as a beam corresponding in cross section to the dimensions of the crystals (about 1 inch square is suitable for some installations) down into the material of work piece 16, which is usually of metal. These mechanical vibration wave trains are reflected, as by a crack or flaw or inhomogeneity in the work or by the surface of the work opposite the transducer 14. The reflected wave trains pass through the sending crystals 40, 42 and actuate the receiving crystal 44, causing it to vibrate in pulses at the frequency of the reflected vibration trains and therefore at the frequency of the exciting voltage trains. The resultant vibration of crystal 44 creates an oscillating potential difference between the electrodes 46e and 46f of the receiving crystal and these potenial variations are impressed on the amplifier 20 by the high lead 19 of the shielded cable 18 and by the ground connections 50', 50, 52, 54, 16 and 17.

The amplified voltage trains then pass to rectifier 22 through cable 24. The rectified trains are impressed on the oscilloscope 26 by cable 28 and are indicated (for instance on a fluorescent screen) by vertical deflections of the oscilloscope electron beam, which sweeps back and forth horizontally at a rate established by the linear sweep device 30. Linear sweep 30 is connected by cable 32 to the train generator 10 so that the oscilloscope spot or electron beam may be started sweeping horizontally at the instant each exciting voltage train is sent out by the train generator. Each wave train or pulse may consist of only five waves, for typical operation, and the whole process of sending out the pulse and observing the reflection may be repeated 60 times per second so that the indication of flaws on the oscilloscope screen appears continuous. Where the improved transducer disclosed herein is used with the resonance method of testing, as described in application Serial No. 511,090, now Patent No. 2,439,131, then the time duration of the voltage trains are preferably lengthened so as to create wave trains in the material each of which is from five to fifty times the thickness of the piece under test. As a matter of fact, the transducer of the present invention may be used with continuous waves, as well as wave trains, particularly with the resonance method of testing; it offers many advantages particularly suitable for continuous wave testing.

Approximately equal sensitivity may be had by using crystal 44 (or 44') for sending and crystals 40 and 42 for receiving, in which event the connections are appropriately changed or, if desired, by placing crystals 40, 42 on top of crystal 44.

It will be seen that the crystal sandwich construction described above enables excellent shielding to be maintained between the sending and receiving systems. For instance when the shield partitions 50', 50 are grounded as shown in the drawing and connected to the electrodes (or electrode) of the crystals 42 and 44 the high wires 19 and 13 of the amplifier and wave train generator respectively are completely shielded from each other by grounded conductors throughout the structure. Further, the entire crystal assembly and support is shielded by the grounded housing 52.

It is possible to use a single crystal in inspecting material with the Supersonic Reflectoscope as described in my Patent No. 2,280,226. But if this is done, the amplifier of the reflectoscope is connected to the crystal at all times and it is therefore subjected to the large voltage impressed upon the crystal at the time when the waves are sent out. This overloads the amplifier and requires a material time in some installations for it to recover its full sensitivity, thereby increasing the difficulty of finding flaws near the crystal.

These disadvantages may be obviated and yet the advantage of a single crystal namely, the complete overlapping of the transmitted wave beam and the region of sensitivity to reflections, may be gained, by utilizing a unitary transducer assembly constructed and connected according to the teaching of this invention, in which separate sending and receiving crystals are provided which are mechanically connected and which may be handled as a unit but which may be electrically separated or isolated. According to this invention, the region of radiation of the sending crystal may be made coextensive with the region of sensitivity of the receiving crystal.

The type of transducer described and claimed herein is particularly useful in searching for flaws which are near the sending point. The sending crystal sends out the waves in a beam which in many cases is reflected back in the same path to the sending crystal; if the receiving crystal were separate and placed beside the sending crystal some of the reflected wave energy may fail to strike it. But with the receiving crystal placed over the sending crystal or in alignment therewith the receiving crystal is capable of picking up reflected waves which lie in the same path as the original beam. Yet the receiving and sending crystals may be electrically shielded from each other so that the amplifier is not subjected to the full voltage of the voltage train generator at the moment when the waves are sending out, but is subjected merely to that voltage which is generated by the receiving crystal in response to the reflected wave trains received by it.

The expression "material medium" as used herein is defined as a portion of matter which is capable of transmitting a mechanical vibration wave (an elastic wave).

It is to be understood that the invention is not limited to the specific embodiment herein illustrated and described, but may be used in other ways without departure from its spirit as defined by the following claims.

I claim:

1. In a material inspection apparatus, a unitary transducer adapted to be placed in contact with a surface of said material under inspection for sending and receiving mechanical vibration waves into and from the material to be inspected, said unitary transducer comprising, at least two piezoelectric crystals, means for impressing potential variations across one of said crystals, means for utilizing the resulting vibrations of said one crystal to generate mechanical vibration waves in said material, means for detecting potential variations created across another of said crystals by said mechanical vibration waves generated in said material, means other than said material for securing said crystals together mechanically, and means for separating said crystals electrically.

2. In a supersonic wave material inspection apparatus, a sending circuit, a receiving circuit, a plurality of transducers cemented together in the form of a sandwich, and means for electrically connecting one of said transducers to said sending circuit and another of said transducers to said receiving circuit, said sandwich having a vibratile surface portion adapted to be placed in contact with a surface of said material under test for sending mechanical vibration waves into said material and for receiving mechanical vibration waves from said material.

3. The combination of claim 2, including means for electrically shielding said one transducer and said sending circuit from said other transducer and said receiving circuit.

4. A crystal sandwich comprising, first and second X-cut quartz crystals of opposite polarity secured together with their X axes in alignment, a common electrode for both of said crystals positioned between adjacent faces thereof, a third crystal secured to one of said first two crystals, and a common electrode for said third crystal and said one crystal positioned between adjacent faces thereof.

5. The combination of claim 4, including means for electrically shielding said first and second crystals from said third crystal.

6. In a material inspection apparatus, means including a sending transducer for sending a beam of supersonic vibration waves into a selected region of a material to be inspected, and a receiving transducer overlapping and in effective mechanical contact with said sending transducer and lying within the path of vibration waves which are reflected back along the axis of said beam from said selected region, said transducers having a common vibratile wave generating and wave receiving surface portion adapted to be placed in effective mechanical contact with a surface of said material.

7. The combination of claim 6 including means for electrically shielding said receiving transducer from said sending transducer.

8. In a material inspection apparatus, a transducer adapted to be placed in effective mechanical contact with the material to be inspected for sending sound waves into and receiving reflected sound waves from, said material comprising, overlapping sending and receiving piezoelectric crystals in effective mechanical contact and having acoustical regions of action which completely overlap, and means for electrically separating said sending and receiving crystals.

9. In an apparatus for inspecting solid material by means of reflected mechanical vibration waves, electrically isolated wave sending and receiving circuits and means, comprising aligned sending and receiving transducers in effective mechanical contact and aligned along the path of said waves and having a common wave generating and wave receiving surface adapted to be placed in effective mechanical contact with a surface of said material, for respectively radiating said waves into said material when energized by the sending circuit and for applying a potential, created by said reflected waves, to the receiving circuit without materially affecting the electrical isolation of said circuits.

10. In a transducer for sending and receiving sound waves, a pair of piezoelectric crystals of opposite polarity and of approximately the same thickness, and a third piezoelectric crystal having approximately twice the thickness of each of said pair of crystals.

11. The combination of claim 10, including means for mechanically connecting said crystals with their principal faces in effective mechanical contact.

12. A crystal sandwich comprising, first and second X-cut quartz crystals of the same polarity secured together with their X axes in alignment, a common electrode for both of said crystals positioned between adjacent faces thereof, a third crystal secured to one of said first two crystals, and a common electrode for said third crystal and said one crystal positioned between adjacent faces thereof.

13. A unitary transducer assembly for sending elastic waves into a material medium when a first electrical circuit is energized and for generating a voltage in a second electrical circuit when elastic waves are received by said transducer assembly from said material medium, comprising, a first transducer means for sending elastic waves into said material medium when a first electrical circuit is energized, and a second transducer means for generating voltage in a second electrical circuit when elastic waves are received from said material medium, one of said transducer means being in mechanical contact both with said medium and with said other transducer means and serving to transmit elastic waves therebetween.

14. A transducer assembly as recited in claim 13, in which means are provided for shielding said first electrical circuit from said second electrical circuit.

15. In a material medium inspection device, a first crystal transducer means for transmitting a highly directional beam of supersonic vibration waves into said medium, and a second crystal transducer means which makes effective mechanical contact with said medium through the structure of said first transducer means for receiving reflections of said vibration waves.

16. In combination, stacked electrically isolated wave radiating and wave absorbing transducers excitable by and energizing respectively transmitting and receiving circuits, said transducers being connected mechanically and having a common vibratile wave generating and wave receiving surface portion located at one face of one of said transducers whereby said one transducer acts as a wave transmitting means between said surface and the transducer mechanically connected thereto, said surface portion providing a wave generating and wave receiving surface area adapted to be placed in effective mechanical contact with a surface of a material medium to be inspected for transmitting vibration waves from said radiating transducer to said material medium and from said material medium to said absorbing transducer.

17. The combination of claim 1 including sound attenuating substance affixed to the crystal face most distant from the surface of contact between the unitary transducer and said material to be inspected and preventing receipt by said transducer of any sensible reflection from said substance.

18. The combination of claim 2 including sound attenuating substance affixed to the side of said transducer sandwich opposite said vibratile surface portion and preventing receipt by said transducer of any sensible reflection from said substance.

FLOYD A. FIRESTONE.

REFERENCES CITED

The following references are of record in the file of this patent:

UNITED STATES PATENTS

| Number | Name | Date |
|---|---|---|
| Re. 20,680 | Sawyer | Nov. 29, 1938 |
| 1,495,429 | Nicolson | May 27, 1924 |
| 1,667,540 | Dorsey | Apr. 24, 1928 |
| 1,734,926 | Tripp | Nov. 5, 1929 |
| 1,959,429 | Hovgaard | May 22, 1934 |
| 1,973,673 | Rice | Sept. 11, 1934 |
| 2,073,251 | Myers | Mar. 9, 1937 |
| 2,227,268 | Mason | Dec. 31, 1940 |
| 2,280,226 | Firestone | Apr. 21, 1942 |
| 2,320,390 | Shmurak | June 1, 1943 |
| 2,418,538 | Yetter | Apr. 8, 1947 |
| 2,483,821 | Firestone | Oct. 4, 1949 |
| 2,484,623 | Heising | Oct. 11, 1949 |